W. J. TROMP.
PLOW.
APPLICATION FILED JUNE 3, 1920.
1,436,614.
Patented Nov. 21, 1922.
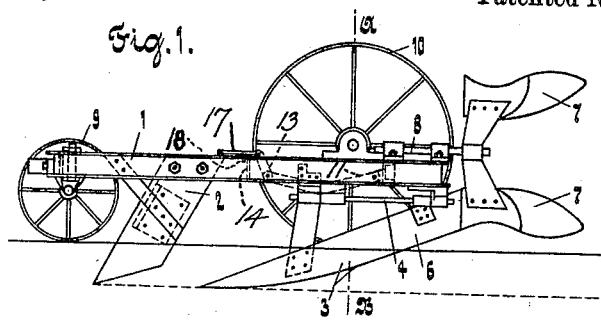
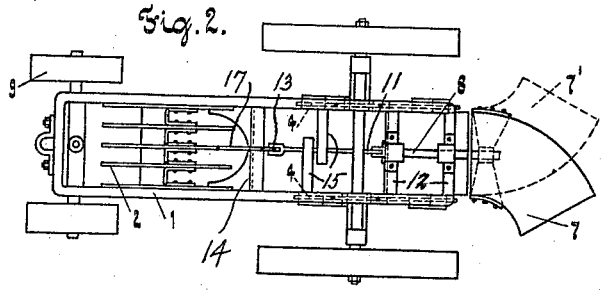
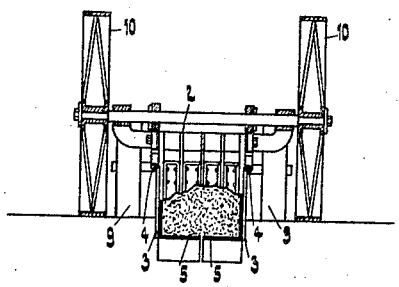
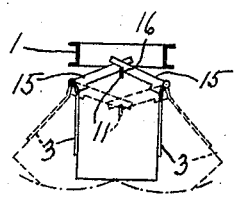
Inventor:
Wilhelm Johan Tromp,
by Emil Bonnelycke
Attorney.

Patented Nov. 21, 1922.

1,436,614

UNITED STATES PATENT OFFICE.

WILHELM JOHAN TROMP, OF BILTHOVEN, NETHERLANDS.

PLOW.

Application filed June 3, 1920. Serial No. 386,330.

*To all whom it may concern:*

Be it known that I, WILHELM JOHAN TROMP, a subject of the Queen of the Netherlands, residing at Bilthoven, in the Province of Utrecht, in the Kingdom of the Netherlands, have invented certain new and useful Improvements in Plows, of which the following is a specification.

This invention relates to plows for making furrows of rectangular cross-section. Its object is, more particularly, to provide a plow suitable for plowing moorland and the like, and for use in sugar plantations, the various uses including the making of furrows or trenches for planting young trees. My improved plow has a share of U-shaped cross-section and the invention is designed, in particular, to enable the plow to be turned easily and quickly at the end of the furrow or trench, and to dispose of the difficulty of clearing away the soil from the share before it is turned, this being of great importance when working on a large scale as for example on extensive plantations. In my improved plow I provide means whereby the soil can be thrown over towards opposite sides of the plow, according to which direction the plow is traveling in.

According to the invention the share of U-shaped cross section consists of two symmetrical parts or members disposed at opposite sides of a vertical plane, and each of these members can rotate independently of the other about a separate, approximately horizontal axis, so that the two members can swing apart, when not locked together for operating in the normal manner. Behind this share I provide two mold boards, one delivering to the left and the other to the right, these mold boards being mounted on a common, centrally disposed axle. By turning this axle, or rocking the mold boards thereon, I can place either of the mold boards in operative relation with the share, and then lock it in that position.

The invention is illustrated in the accompanying drawing, showing one embodiment thereof, Fig. 1 being a longitudinal section of the plow, Fig. 2 a plan view, Fig. 3 a section on the line A—B of Fig. 1, and Fig. 4 a vertical detail section of the main share.

In the drawing, 1 designates the frame, 2 are spaced parallel colters, and 3 is the main share, which is located in rear of the colters and consists of two parts, symmetrical in respect of a vertical longitudinal plane, and forming in conjunction an implement of U-section. Each of the two members of this share 3 can turn upon an axle 4, which is approximately horizontal and approximately parallel with the said longitudinal plane; but in the normal working of the plow, the two members are locked together by a locking device of any suitable, known type, the particular device here shown forming no part of the invention. The device illustrated comprises a lever 11 pivoted at its rear end to the rear cross-bar 12 of the frame 1 and carrying at its front end a detent 13, the nose of which is designed to catch over the front cross-bar 14. The lever 11 extends forwardly beneath a pair of arms 15 which are rigidly secured to the side walls of the share members and project in an inward direction but in disalined relation to each other, the inner or free end portions of these arms being cut away to provide shoulders 16 for engagement with said lever. Hence, when the lever is raised, it will swing the share sections inwardly into active position, and said sections will be retained in such position when the detent 13 is hooked over bar 14; but when said detent is released from bar 14, then lever 11 will swing downward by gravity, and similarly the share sections will swing outwardly into open position. The detent 13 itself may be held against accidental displacement by means of a T-shaped catch 17, the depending stem portion 18 of which is designed to hook over the front edge of bar 14. This catch 17 must, therefore, be disengaged from bar 14 before detent 13 can be released. The bottom 5 of the share rises towards the rear and makes an acute angle with the floor of the furrow, and its front edge curves inwards, so that two points or horns are formed, such construction facilitating the digging out of the soil. The side walls 6 of the share 3 increase in depth from front to rear, and leave the share open at the back. Behind the share 3 there are mounted two mold boards 7, both upon a horizontal axle 8, by which they are carried at an angle of 180° to each other. These mold boards are for alternative use, and deliver the slice to the right and left respectively. The mold board in use adjoins, or nearly adjoins, the rear edge of bottom 5 of the share 3, and may be locked in this position in any desired manner.

The frame 1, which may be of any convenient construction, has wheels 9 and 10 of sizes and type suited to the nature of the work and soil and to the means used for operating the plow. The colters 2 may be dispensed with on light, sandy soil, and instead of two rear wheels there may be a single rear wheel running in the furrow. The mold boards 7 may be fixed to the axle 8 and turn therewith, or may turn thereon by means of rotatable hubs or bosses. The position of the mold boards is changed when the plow is turned, so that after turning, the slice of soil is delivered at the opposite side of the flow and builds up the ridge between the old and the new furrow.

The mold boards are designed according to the particular purpose in view. They may have vertical side walls and form, in their lower position, practically a continuation of the share 3, a short distance above the soil. A convenient way of operating the plow is by a tractor with caterpillar wheels, and such tractor may be associated with the plow in one structure, that is to say they may have a frame in common.

When the plow approaches the end of the field, the two members of the share 3 are unlocked, the plow continuing to travel in the same direction. The two members then rotate upon their respective axles, and move apart, gradually disengaging themselves from the soil, whereupon the plow can be turned quite easily. The share members are then re-locked in the working position and the axle 8 is turned to lower the other mold board 7, so that when the new furrow is made the earth is thrown over towards the old furrow.

This plow is particularly adapted for operating according to the Reynoso system, for example in Java, in which the furrows are of rectangular section and run in a north and south direction, so that the young plants are thus protected to a great extent by the side walls of the furrows from the direct action of the sun's rays, while at the same time the bottoms of the furrows are prevented from drying out.

What I claim as my invention and desire to secure by Letters Patent of the United States is:—

1. In a plow, the combination of two share members movable toward each other into position to conjointly form a share of U-section, and means for releasably locking said members in such position.

2. In a plow, the combination of a frame; a share comprising a pair of companion members mounted on said frame for swinging movement toward and from each other about spaced, horizontal axes which are disposed in parallel relation to each other and to the longitudinal axis of the plow, into and out of position to conjointly form a share of U-section; and locking means engageable with the share members to hold them in such position, but releasable to permit said members to swing away from each other.

3. In a plow, the combination of a frame; a pair of companion share members mounted on said frame for swinging movement toward and from each other into and out of position to conjointly form a share of U-section; means for releasably locking said share members in such position; and a pair of rigidly related mold boards mounted on the frame and projecting in opposite directions for discharging the soil cut by the share alternatively to one side or the other of the plow, said mold boards being movable as a unit to bring either one of them at a time into operative relation to said share.

4. In a plow, the combination of a frame; a pair of companion share members mounted on said frame for swinging movement toward and from each other into and out of position to conjointly form a share of U-section; means for releasably locking said share members in such position; a centrally-arranged, mold-board supporting shaft disposed horizontally and longitudinally of the frame; and a pair of mold boards carried by said shaft and projecting in opposite directions for discharging the soil cut by the share alternatively to one side or the other of the plow, said mold boards being movable alternatively into operative relation to said share.

5. In a plow, the combination of a frame; a share comprising a pair of companion members mounted on said frame for swinging movement toward and from each other about spaced, horizontal axes which are disposed in parallel relation to each other and to the longitudinal axis of the plow, into and out of position to conjointly form a share of U-section; locking means engageable with the share members to hold them in such position, but releasable to permit said members to swing away from each other; a centrally-arranged, mold-board supporting shaft mounted in the frame midway between and parallel with the axes of movement of the share members; and a pair of mold boards mounted on the frame and projecting in opposite directions for discharging the soil cut by the share alternatively to one side or the other of the plow, said mold boards being movable alternatively into operative relation to said share.

In testimony whereof I have hereunto set my hand this 18th day of May 1920.

WILHELM JOHAN TROMP.